US006744572B1

(12) United States Patent
McCormick

(10) Patent No.: US 6,744,572 B1
(45) Date of Patent: Jun. 1, 2004

(54) SYSTEM AND METHOD FOR IMAGING AN OBJECT

(75) Inventor: Bruce H. McCormick, College Station, TX (US)

(73) Assignee: The Texas A&M University System, College Station, TX (US)

(*) Notice: Subject to any disclaimer, the term of this patent is extended or adjusted under 35 U.S.C. 154(b) by 98 days.

(21) Appl. No.: 09/948,469

(22) Filed: Sep. 6, 2001

Related U.S. Application Data
(60) Provisional application No. 60/230,376, filed on Sep. 6, 2000.

(51) Int. Cl.$^7$ .................. G02B 27/02; G02B 21/02; G02B 27/00; B26D 5/00
(52) U.S. Cl. .................. 359/799; 359/389; 359/809; 83/73; 83/365
(58) Field of Search .................. 83/73, 365, 856; 356/606; 359/389, 799, 809

(56) References Cited

U.S. PATENT DOCUMENTS

| | | | | |
|---|---|---|---|---|
| 4,021,118 A | * | 5/1977 | Söderkvist et al. | 356/614 |
| 4,532,838 A | * | 8/1985 | Söderkvist | 83/13 |
| 4,581,969 A | * | 4/1986 | Kim | 83/856 |
| 4,697,489 A | * | 10/1987 | Kim | 83/856 |
| 5,752,425 A | * | 5/1998 | Asakura et al. | 83/713 |

OTHER PUBLICATIONS

B. Bracegirdle, The development of biological preparative techniques for light microscopy (Sep. 1989), Journal of Microscopy, vol. 155, Part 3, pp. 307–318.*
A. Odgaard et al., "Direct method for fast three–dimensional serial reconstruction" (Sep. 1990), Journal of Microscopy, vol. 159, Part 3, pp. 335–342.*
V. Biserkov et al., Mini–microtome for preparing serial sections directly on a light microscope stage (Jul. 1995), Journal of Microscopy vol. 179, Part 1, pp. 90–93.*
H. Brismar et al., "Method of estimating the thickness of fluorescent structures using a confocal scanning laser microscope" (Nov. 1996), Journal of Microscopy vol. 184, Part 2, pp. 106–116.*
M. Kokubo et al., "Development of an automatic thin sectioning system for light microscopy" (Jun. 2000) Japanese Journal of Medical Electronics and Biological Engineering vol. 38, No. 2, pp118–126.*
A. Khokhlov et al. "A piezoelectric vibroknife for the microtome" (Mar. 1997) Instruments and experimental techniques, vol. 40, No. 3, pp. 422–423.*
B.P. Burton, "Automated 3D Reconstruction of Neuronal Structures From Serial Sections," MS Thesis, *Department of Computer Science, Texas A&M University*, 1999.
B.P. Burton, B.H. McCormick, R. Torp and J.H. Fallon, "Three–dimensional reconstruction of neuronal forests," *Neurocomputing*, vol. 38–40, pp. 1643–1650, 2001.
W. Koh and B.H. McCormick, "Organization and visualization of brain tissue volume data," *Neurocomputing*, vol. 38–40, pp. 1679–1685, 2001.
W. Koh and B.H. McCormick, "Distributed, web–based microstructure database for brain tissue," *Neurocomputing*, vol. 32–33, pp. 1065–1070, 2000.
W. Koh and B.H. McCormick, "Brain microstructure database system: and exoskeleton to 3D reconstruction and modeling," *Computational NeuroScience*, 2001.
B.H. McCormick, "Brain Tissue Scanner Enables Brain Microstructure Surveys," *Computational NeuroScience*, 2001.
B.H. McCormick, "Design of a brain tissue scanner," *Neurocomputing*, vol. 26–27, pp 1025–1032, Jun. 1999.

* cited by examiner

Primary Examiner—David N. Spector
(74) Attorney, Agent, or Firm—Baker Botts L.L.P.

(57) ABSTRACT

A method for imaging an object is provided that includes generating and directing optical energy onto a portion of an object. The portion of the object is cut while the optical energy is directed onto the portion. Reflected optical energy from the object is received by an optical element while the portion is being cut such that data relating to an image associated with the portion is communicated to the optical element.

23 Claims, 4 Drawing Sheets

SYSTEM AND METHOD FOR IMAGING AN OBJECT

CROSS REFERENCE TO RELATED APPLICATIONS

This application claims benefit from U.S. Provisional Patent Application Serial No. 60/230,376, filed on Sep. 6, 2000, by Bruce H. McCormick, entitled "Knife-Edge Scanner System and Method".

TECHNICAL FIELD OF THE INVENTION

This invention relates in general to imaging and, more particularly, to a system and method for imaging an object.

BACKGROUND OF THE INVENTION

The field of microscopy has become increasingly important in today's society. One aspect of microscopy relates to the imaging of a specimen or object sought to be evaluated. Imaging generally refers to data collection in order to generate visualization of a given area. The ability to efficiently and accurately image data relating to a given specimen may be important for determining one or more characteristics associated with the specimen or object. Instruments or devices currently being used for such imaging applications are generally problematic due to a number of reasons, such as misalignment, distortion of images, low resolution, poor efficacy or slow speed, for example.

SUMMARY OF THE INVENTION

According to one embodiment of the present invention, a method is provided for imaging an object that includes generating and directing optical energy onto a portion of an object. The portion of the object is cut while the optical energy is directed onto the portion. Reflected optical energy from the object is received by an optical element while the portion is being cut such that data relating to an image associated with the portion is communicated to the optical element.

Embodiments of the present invention provide a number of technical advantages. Some embodiments may include some, all, or none of these advantages. According to one embodiment of the present invention, back scattering effects, which relates to undesired data, are substantially reduced or effectively eliminated. With the use of a cutting instrument that serves as an optical collimator, imaging of only a portion of the specimen to be examined is achieved. Thus, inadvertent imaging of the area below the portion of the cutting instrument is eliminated. This allows the specimen to be evaluated in great detail with enhanced accuracy and efficacy and without back scattering from portions of the specimen below the cutting instrument.

According to one embodiment of the present invention, because imaging is performed as a section of the specimen is being cut by the cutting instrument, potential damage to or degradation of the specimen may be substantially avoided. By allowing a continuous and concurrent image scanning (i.e. while a layer of the specimen is being sectioned), wrinkling, deformation, or tearing of the specimen generally associated with removing the layer before imaging it is significantly reduced or avoided.

Other technical advantages are readily apparent to one skilled in the art from the following figures, the descriptions, and the claims.

BRIEF DESCRIPTION OF THE DRAWINGS

A better understanding of the present invention will be realized from the detailed description which follows, taken in conjunction with the accompanying drawings in which.

DETAILED DESCRIPTION OF EXAMPLE EMBODIMENTS OF THE INVENTION

Example embodiments of the present invention and their advantages are best understood by referring now to FIGS. 1A through 6 of the drawings in which like numerals refer to like parts.

Figure 1A:
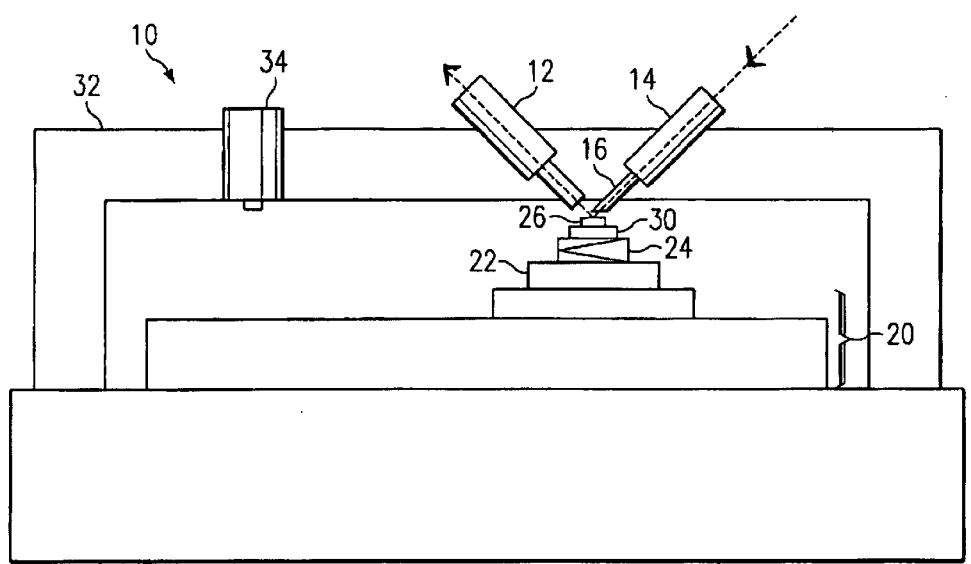
FIG. 1A is a diagrammatic side view illustrating an imaging system in accordance with one embodiment of the present invention.

FIG. 1A is a diagrammatic side view illustrating an imaging system 10 in accordance with one embodiment of the present invention. Imaging system 10 includes an optical element 12, a line generator 14, and a cutting instrument 16. A base 18 may be provided to stabilize imaging system 10. Additionally, an X-axis stage 20, a Y-axis stage 22, and a Z-axis elevator stage 24 are also provided in order to position or otherwise effect movement of a specimen 26 to be examined or otherwise evaluated using imaging system 10. (Specimen 26 has a thickness that been exaggerated in FIGS. 1A through 6, as compared to one example thickness, in order to facilitate a greater understanding of the present invention; this exaggeration should not be construed to limit or otherwise restrict the present invention in any way and has been offered only for teaching purposes. The present invention may be utilized with specimens having any thickness.)

According to the teachings of the present invention cutting instrument 16 serves as an optical prism for imaging system 10 and also serves to physically section a portion of specimen 26. Physical sectioning of specimen 26 is performed concurrently with imaging, or data acquisition, of the portion being cut; optical element 12 and line generator 14 cooperate with each other and cutting instrument 16 in order to facilitate this process. This allows three dimensional volume imaging to be accomplished simultaneous with the sectioning of specimen 26. According to one embodiment of the present invention, the integrity of specimen 26 is also maintained during the sectioning process as a result of specimen 26 being sampled in situ at a high rate of speed while avoiding the problems of: 1) over-exposure to optical energy provided by line generator 14, and 2) degradation or deformation of a portion of specimen 26 that is physically removed and repositioned before imaging the desired area. Additionally, the present invention ensures that an accurate image of a target area of specimen 26 is captured because of the inherent nature of cutting instrument 16 operating as an optical prism. Cutting instrument 16 provides a barrier to interference data that would otherwise be collected from layers of specimen 26 below the portion being sectioned by cutting instrument 16. This unwanted interference data, or backscattering, may operate to reduce the accuracy of an associated system, whereas the present invention substantially avoids this dilemma.

Optical element 12 serves to receive or otherwise collect optical energy reflected at cutting instrument 16. According to one embodiment of the present invention, optical element 12 comprises a microscope, a slit-scan camera, a set of linear array sensors, and one or more lenses. Additionally, optical element 12 may be inclusive of only a camera or only a microscope or any combination thereof. Alternatively, optical element 12 may be any component, unit or structure operable to receive or otherwise collect optical energy reflected by cutting instrument 16.

According to one embodiment of the present invention, the microscope, the slit-scan camera, the set of linear array sensors, and the lenses of optical element 12 cooperate in order to image a target area being sectioned by cutting instrument 16. Unlike a conventional digital camera that provides an area scan of a target, a slit-scan camera included in optical element 12 may generally capture a narrow target area, directing the data in one direction to one or more linear array sensors. Although optical element 12 is described as including a slit-scan camera, the present invention contemplates that any other suitable camera operable to image a section of specimen 26 in cooperation with one or more linear array sensors may be used. Additional details relating to the lenses and the linear array sensors included within the internal structure of optical element 12 are described below with reference to FIG. 2.

Line generator 14 is an optical energy generator operable to generate a laser beam according to one embodiment of the present invention. Line generator 14 generates a laser beam approximately 30 microns wide and the length of the edge of cutting instrument 16 that is directed toward the portion of specimen 26 to be sectioned in one embodiment of the present invention; however line generator 14 may alternative generate any other suitable optical energy beam. Line generator 14 may be positioned at an angle of approximately 45° to specimen 26 in one embodiment; however, line generator may be positioned at any other suitable angle according to particular needs. Line generator 14 is positioned such that optical element 12 may effectively gather or otherwise capture optical energy transmitted, reflected, or otherwise communicated by the portion of specimen 26 being sectioned. In another embodiment of the present invention, line generator 14 is a white light source generator providing an optical beam of white light to specimen 26 to be reflected and imaged by optical element 12. The white light source generator may generally provide a sufficiently narrow optical image line beam to specimen 26 for processing suitable to and coordinated with optical element 12. Although described as an optical energy generator operable to generate a laser beam, line generator 14 may be any suitable optical source or component that can generate, supply or otherwise direct optical energy toward specimen 26. The present invention also contemplates that line generator 14 may be positioned such that it is co-axial with cutting instrument 16. When line-generator 14 is co-axial with cutting instrument 16, optical energy is generated and directed proximate to or through cutting instrument 16 and onto specimen 26.

One concern associated with volume imaging addressed by the present invention is the degradation or deformation aspects of light generally on a given specimen. Essentially, if the specimen fails to move quickly enough, specimen 26 may be damaged (potentially irreparably). Thus, imaging system 10 provides the advantage of maintaining a suitable speed or an appropriate course of motion without overexposing tissue associated with specimen 26 to the potentially damaging effects of light. In some embodiments, imaging system 10 accomplishes this desired movement while maintaining high levels of precision, accuracy, and resolution in the image acquisition.

Cutting instrument 16 comprises a knife that includes a tip acting as an optical prism for reducing the visibility of tissue below the edge of the tip, according to one embodiment of the present invention. Thus, cutting instrument 16 is used as an optical collimator for the optical train for optical element 12. The tip of cutting instrument 16 internally-reflects optical energy directly toward optical element 12 such that excitation energy generally propagating in improper directions and negatively influencing imaging accuracy is substantially reduced or otherwise eliminated. According to the teachings of the present invention, cutting instrument 16 has a tip formed of diamond that operates to section a portion of specimen 26 to be examined. The diamond tip is transparent and effectively acts as an optical prism as described above. Use of an optical prism in cutting instrument 16 also avoids unwanted fluorescence bleaching from deep voxels associated with conventional image scanning devices in certain applications. This fluorescent bleaching may operate to generally hinder the accuracy or skew the results of an associated imaging data or scanning system.

The tip of cutting instrument 16 is sharpened such that its edge is approximately 1–5 nanometers in one embodiment of the present invention; however, the tip may be any other suitable sharpness according to particular needs. Although described as having a diamond tip, cutting instrument 16 may include any edge operable to facilitate sectioning or bifurcation of specimen 26. Additionally, cutting instrument 16 may include a tip formed of any other suitable material for sectioning specimen 26, such as glass, metal, crystal, sapphire, and plastic, for example. In another embodiment of the present invention a microtome or a laser may be used to facilitate the sectioning of specimen 26 to be examined using imaging system 10.

Base 18 is a flat ground granite platform according to one embodiment of the present invention. Base 18 provides stability for specimen 26 so that it may be sectioned accurately. Base 18 supports X-axis stage 20, Y-axis stage 22 and Z-axis elevator stage 24. Although described as a high resolution precision platform, base 18 may alternatively be a mechanical structure, such as a ball and screw stage, for example, or any other suitable structure operable to provide stability and/or maneuverability to specimen 26. Additionally, although described as being formed of granite, base 18 may be formed of any suitable material or be eliminated entirely according to particular needs. Base 18 supports X-axis stage 20, which is positioned on top of a flat surface of base 18.

X-axis stage 20 supports specimen 26 in order that it may be sectioned and imaged. X-axis stage 20 provides movement in one direction according to the teachings of the present invention. According to one embodiment of the present invention X-axis stage 20 is an air-bearings stage providing lateral movement and facilitating a cutting axis for cutting instrument 16 to section specimen 26. X-axis stage 20 may be a precision positioning stage providing resolution in the order of approximately 20 nanometers. This precision positioning system ensures high accuracy synchronized imaging of the edge of cutting instrument 16 with movement of specimen 26. X-axis stage 20 rests on base 18 and supports Y-axis stage 22.

Y-axis stage 22 may also be a precision stage providing movement in one direction, potentially perpendicular to the movement provided by X-axis stage 20. Y-axis stage 22 provides high resolution indexing for specimen 26 to be examined or sectioned using cutting instrument 16. Y-axis stage 22 may also serve as a cutting axis, providing resolution in the order of approximately 20 nanometers according to one embodiment of the present invention. Y-axis stage 22 supports Z-axis elevator stage 24.

Z-axis elevator stage 24 provides movement in one direction (potentially vertical with respect to base 18) to specimen 26. Z-axis elevator stage 24 provides resolution in the order of approximately 25 nanometers. Optionally, a mounting chuck 30 may be supported by Z-axis elevator stage 24; mounting chuck 30 in turn supports specimen 26. According to one embodiment of the present invention Z-axis elevator stage 24, Y-axis stage 22, and X-axis stage 20 are all digitally controlled in order to effect precise indexing of specimen 26 or cutting instrument 16. Alternatively, each of these stages may be manually controlled or remain substantially stationary according to particular needs. Because sampling of specimen 26 may be potentially completed tens of thousands of times over a short distance of sectioning of specimen 26, each of the stages may operate to facilitate collaborative high precision movement effecting accurate motion within imaging system 10. According to one embodiment of the present invention, encoder resolutions for each of the stages may be in order of approximately 10 to 30 nanometers.

According to the teachings of the present invention, cutting instrument 16 may be rigidly mounted over Z-axis elevator stage 24 such that specimen 26 may be repeatedly sectioned into multiple sections. Under digital control, the three-axis precision stage system, as described above, may cooperate with cutting instrument 16 to function as a microtome, sectioning layers from specimen 26 approximately 0.5 microns thick, for example. Although described as a three-axis precision stage, the present invention contemplates that any blocks or elements used to support specimen 26 may be used in conjunction with imaging system 10. Additionally, the order of the X, Y, and Z stages may be varied or modified according to particular needs. The present invention also contemplates that any other type of support, mechanical or electronically controlled, may be used in order to effect accurate sectioning of specimen 26 or any other article or object sought to be evaluated.

Specimen 26 may be biological tissue according to one embodiment of the present invention, such as biological tissue, for example; however, any other suitable element, item, or object may be used according to particular needs. The tissue may be sectioned into thin sections by cutting instrument 16 while being concurrently imaged by imaging system 10. Biological tissue may be any organic material such as bone, brain, heart, skin, or any other material to which sectioning is sought. Alternatively, specimen 26 could be fiber-embedded polymers, carbon-embedded plastics, copper, microelectronic devices (potentially beneficial in the field of reverse engineering), or any other element or object sought to be sectioned, probed, or otherwise examined using imaging system 10. It is also contemplated by the present invention that imaging system 10 may be portable and further operable to communicate with various types of devices and components that facilitate the imaging of or otherwise interface with imaging system 10.

Imaging system 10 may be potentially beneficial in florescence applications, where for example bleaching concerns are problematic. Imaging system 10 may be used to detect green fluorescent proteins in biological matter that serve to identify a host of parameters indicating one or more characteristics associated with a specimen having such proteins. The detection of the presence of such green fluorescent proteins may also signify a certain condition of the associated specimen. The imaging system 10 of the present invention may also be used in any other inspection, assessment, or evaluation, whether on a microanatomical level or on a large scale basis (such as sectioning of a whole brain, for example). The present invention is essentially applicable to any three dimensional/volume imaging of a given object, element, or specimen 26. Additionally, the present invention contemplates that phase/modulation microscopy, line-scanning microscopy, absorption techniques for imaging optical energy, or any other optical imaging system operable to gather or otherwise capture data relating to an image from an object that may be used in conjunction with and benefit from the teachings associated with imaging system 10.

A sectioning mill 34 is also illustrated in FIG. 1A and may be optionally provided on a bridge 32 in order to facilitate the sectioning of specimen 26. Sectioning mill 34 may operate to cut or otherwise separate an object, such as specimen 26 into two or more parts, to be evaluated using imaging system 10. Bridge 32 supports (via suspension, for example) sectioning mill 34 and may provide a sliding capability to sectioning mill 34 such that it may be positioned out of the way when sectioning of specimen 26 is not occurring. Bridge 32 may be coupled to base 18 positioned such that it provides minimal interference to imaging system 10.

Figure 1B:
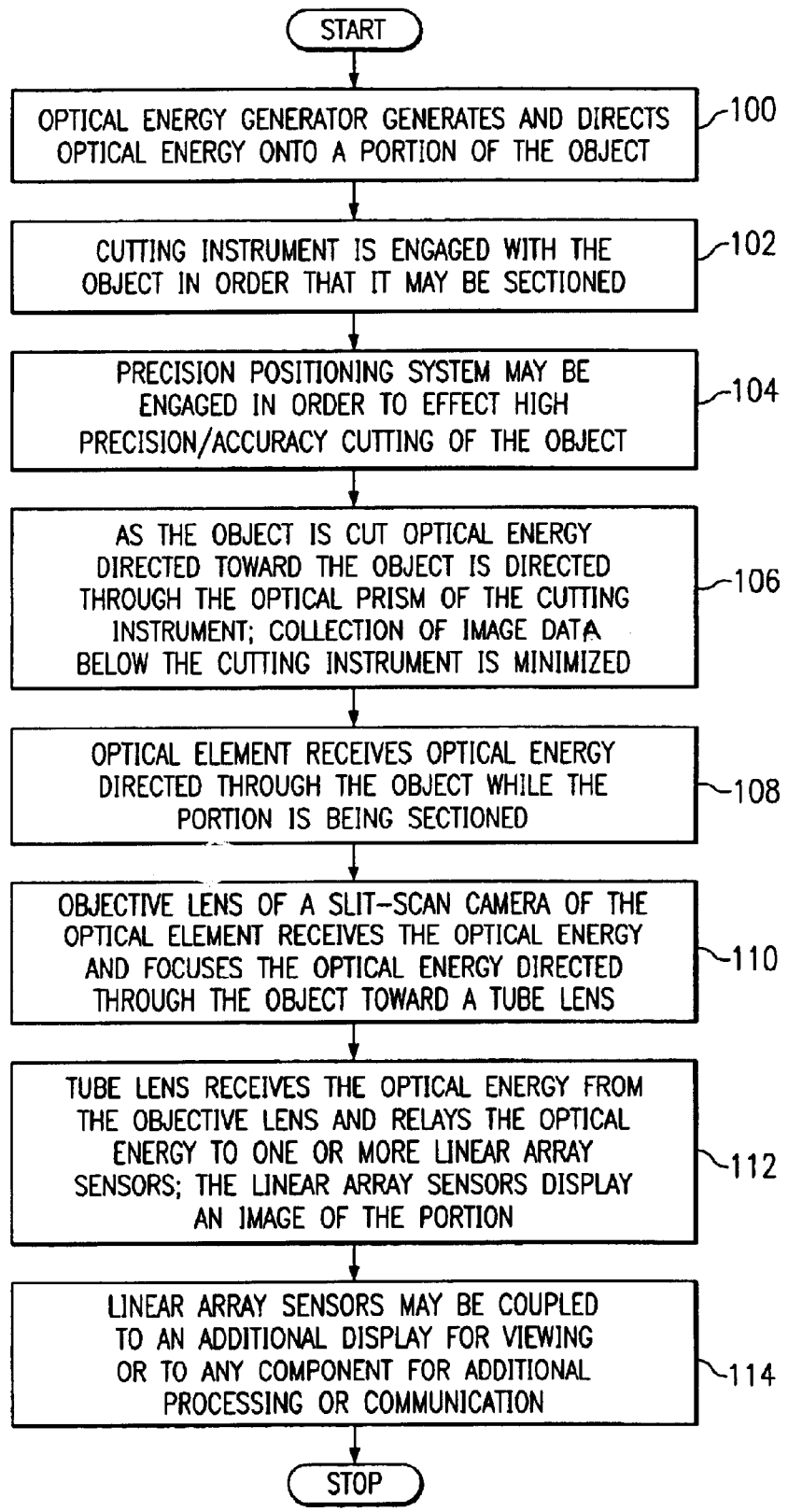
FIG. 1B is a flowchart illustrating a series of steps associated with the imaging system of FIG. 1A in accordance with one embodiment of the present invention.

Referring to FIG. 1B, FIG. 1B is a flowchart illustrating a series of steps associated with imaging system 10 in accordance with one embodiment of the present invention. At a first step 100, optical energy is generated by line generator 14. According to one embodiment, line generator 14 generates a laser beam having an approximate width of 20 to 40 microns that is directed toward the portion of specimen 26 to be cut; however, any other suitable optical beam could be generated that propagates toward specimen 26. Cutting instrument 16 is engaged with specimen 26 in step 102, such that specimen 26 may be sectioned or otherwise cut while optical energy is propagating toward specimen 26.

At step 104, a precision positioning system, such as the one described above with reference to FIG. 1A, may be implemented in order to effect accurate sectioning of specimen 26. The precision positioning system may be electronically or digitally controlled and may operate to section specimen 26 into very thin sections, in the order of 0.1 to 10 microns in one embodiment; however, any other suitable sectioning may be accomplished with use of the present invention.

At step 106, optical energy is reflected from the optical prism of cutting instrument 16 toward optical element 12. Use of cutting instrument 16 with the accompanying optical prism ensures that backscattering, i.e. the collection of unwanted data associated with the part of specimen 26 just below the portion being sectioned, is reduced or otherwise avoided. Optical element 12 receives the reflected optical energy at step 108 while specimen 26 is being sectioned by cutting instrument 16.

According to one embodiment of the present invention, lenses 40 of the slit-scan camera within optical element 12 receive the optical energy reflected by the prism and relating to the portion of specimen 26 being cut at step 110. The objective lens operates to focus the reflected optical energy onto the relay lens; the relay lens communicates the reflected optical energy to one or more linear array sensors 38 as described in step 112. Once the reflected optical energy is at linear array sensors 38, it may be further processed in a number of ways.

According to the teachings of one embodiment of the present invention, a display is provided at step 114. The display receives and utilizes the captured images held by one or more linear array sensors 38 to provide a cohesive illustration of the portion of specimen 26 being cut and examined. According to another embodiment of the present invention, one or more of the linear array sensors 38 may be coupled to a processor or any other suitable component for additional processing, modification or communication to a next destination.

In operation, optical energy propagates from line generator 14 toward specimen 26 positioned optionally on mounting chuck 30. The optical energy is reflected at a surface of cutting instrument 16 as cutting instrument 16 operates to section a portion of specimen 26 to be analyzed. For purposes of example, specimen 26 is a mouse brain to which volume data acquisition is sought. The mouse brain may be embedded in a plastic block in preparation for a systematic removable of multiple sections of a portion of specimen 26. The slit-scan camera provided in optical element 12 may include a 40× objective having an associated field of view (cutting instrument 16 tip width) of 0.625 millimeters.

In operation, multiple strips of the example mouse brain (approximately 0.625 millimeters wide by 13 millimeters long in one example) are cut for each Z-axis elevator stage 24 elevation, in a quasi "field-plowing" scenario, i.e. following a serpentine pattern. For a plastic block height of 6 millimeters, approximately 12,000 sections of specimen 26 may be cut, each approximately 0.5 microns thick; however, these sections may alternatively be cut in any other suitable fashion according to particular needs. The precision positioning systems, as described above, may be used to facilitate highly accurate sectioning of the mouse brain to be examined.

Figure 2:
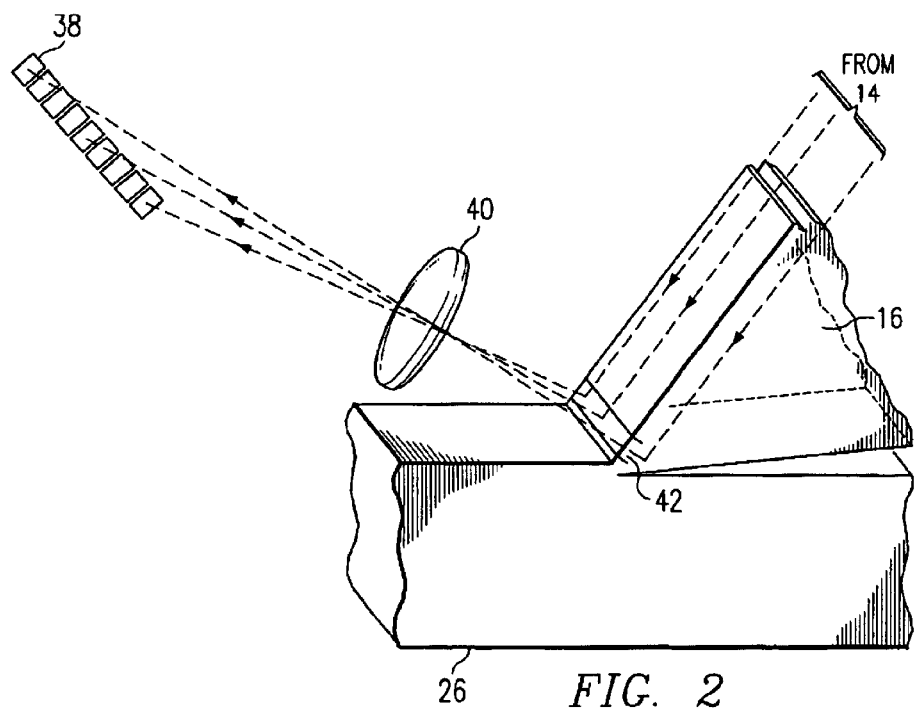
FIG. 2 is a diagrammatic sectional perspective view of the imaging system of FIG. 1A showing additional details of the imaging of a specimen in accordance with one embodiment of the present invention.

Once the optical energy is reflected at the layer of mouse brain being sectioned, optical element 12 in operation captures the reflected energy by a set of optical lenses, which then image the portion being sectioned onto one or more linear array sensors 38 (FIG. 2). Linear array sensors 38 may project or otherwise display the image of the portion at the edge of cutting instrument 16 or alternatively communicate the information for further processing or for display at a remote location. Linear array sensors 38 are described below in greater detail with reference to FIG. 2.

Turning to FIG. 2, FIG. 2 is a diagrammatic sectional perspective, view illustrating additional details of imaging system 10 according to one embodiment of the present invention. FIG. 2 illustrates one or more linear array sensors 38 and a set of lenses 40. Linear array sensors 38 and lenses 40 are included within optical element 12 in order to facilitate imaging of specimen 26. Alternatively, these components may be exterior to optical element 12 where appropriate and according to particular needs.

According to the teachings of the present invention, linear array sensor 38 receives optical energy reflected by a portion of specimen 26 to be imaged. Generally, a particular section of specimen 26 is being imaged onto one or more linear array sensors 38 as the section is being cut by cutting instrument 16. The particular section of specimen 26 to be imaged is illustrated as a band 42.

A single line of tissue from specimen 26 may be imaged onto a single array within linear array sensor 38. Linear array sensors 38 may operate to detect a series of lines being illuminated by line generator 14 at the tip of cutting instrument 16. The present invention contemplates that the slit-scan camera may be included within optical element 12 (either by itself or with accompanying additional components such as lenses 40) and may image multiple lines of data associated with specimen 26, onto multiple (potentially parallel) linear array sensors 38. As the tissue of specimen 26 is moved, or as cutting instrument 16 sections part of specimen 26, the image data may be moved in synchronization to a register coupled to linear array sensors 38, where it may be further processed, stored or displayed. This process allows greater visibility of the same line of a portion of specimen 26 being cut, potentially imaging the target area a hundred times before proceeding to a subsequent line or area of specimen 26 to be imaged.

Band 42 is brought into focus by lenses 40 of an accompanying microscope (potentially along linear array sensors 38 within optical element 12). According to the teachings of the present invention, the slit-scan camera within optical element 12 samples an area of specimen 26 at a rate of approximately 44,000 times per second, i.e. a new line being sampled repeatedly and in a constant progression in one embodiment; however, any other suitable sampling protocol may be used where appropriate. After indexing by motion of any one of the axis stages (Y or Z), the X-axis sampling is synchronized with the motion of X-axis stage 20, as described above with reference to FIG. 1A or alternatively may be synchronized with the motion of cutting instrument 16 or more directly with specimen 26.

Lenses 40 include an objective lens and a tube lens according to one embodiment of the present invention. The objective lens operates to focus an image of specimen 26 at band 42 onto linear array sensor 38. The present a invention contemplates that dry objective lenses may be used for applications such as cutting in air; alternatively, the present invention contemplates that sectioning of specimen 26 may be under oil, water, involve frozen specimens, pressurized specimens, or any other appropriate element or object existing in any other suitable environment in which three dimensional imaging is sought. The objective lens communicates imaged parallel rays reflected by a portion of specimen 26 represented at band 42 onto the tube lens. The tube lens operates as a relay and communicates parallel rays back into an image to be received by linear array sensor 38. This optical matching process between lenses 40 may be associated with infinity optics according to the teachings of one embodiment of the present invention.

Figure 3:
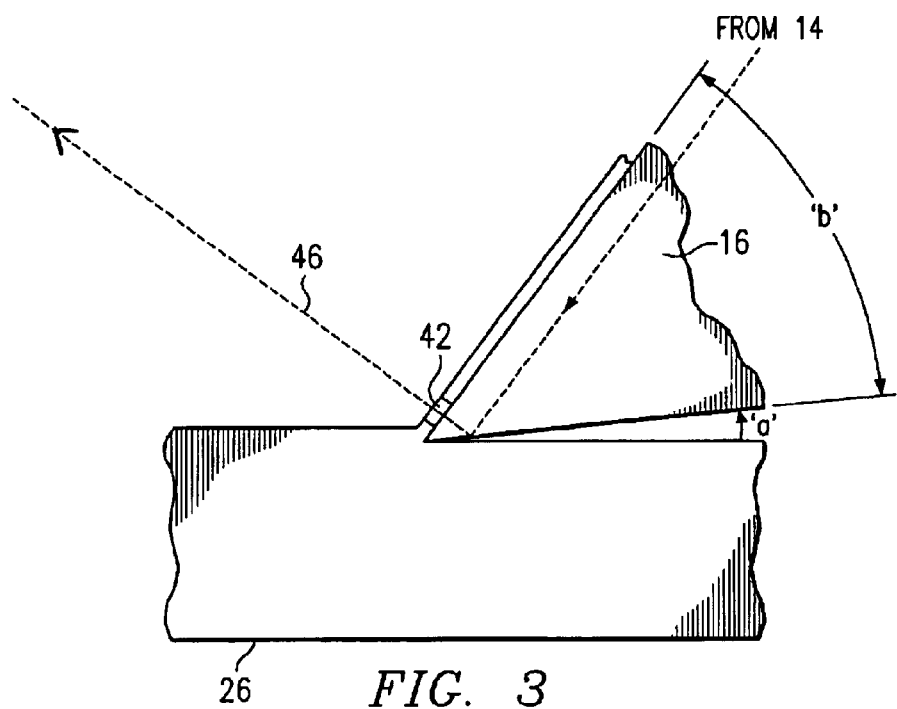
FIG. 3 is a diagrammatic sectional side view of the imaging system of FIG. 1A illustrating details associated with angles included therein in accordance with one embodiment of the present invention.

FIG. 3 is a diagrammatic side view illustrating additional details relating to the positioning of cutting instrument 16. Angle "a" represents a clearance angle for the tip of cutting instrument 16. Angle "a" is approximately 2° to 10° with respect to a horizontal line parallel to the surface of specimen 26; however, any other appropriate clearance angle may be used where appropriate. Additionally, an included angle "b" is provided that represents the placement of cutting instrument 16 in order to effect the sectioning of specimen 26. Angle "b" is approximately 30° to 50° according to one embodiment of the present invention; however, any other appropriate placement angle may be used according to particular needs. According to the teachings of the present invention, these angles operate to section a thin layer from specimen 26. As described above, these disclosed angles 'a' and 'b' are offered only for purposes of example; both angles may be varied significantly according to particular needs.

FIG. 3 also illustrates a dashed line 46, which represents the optical axis for optical system 12. Dashed line 46 is directed at band 42 as knife 16 operates to cut a layer of tissue from specimen 26. According to the teachings of the present invention, the layer of specimen 26 being cut is approximately 0.1 to 10 micrometers in thickness, this layer being simultaneously imaged as it is sectioned.

Figure 4:
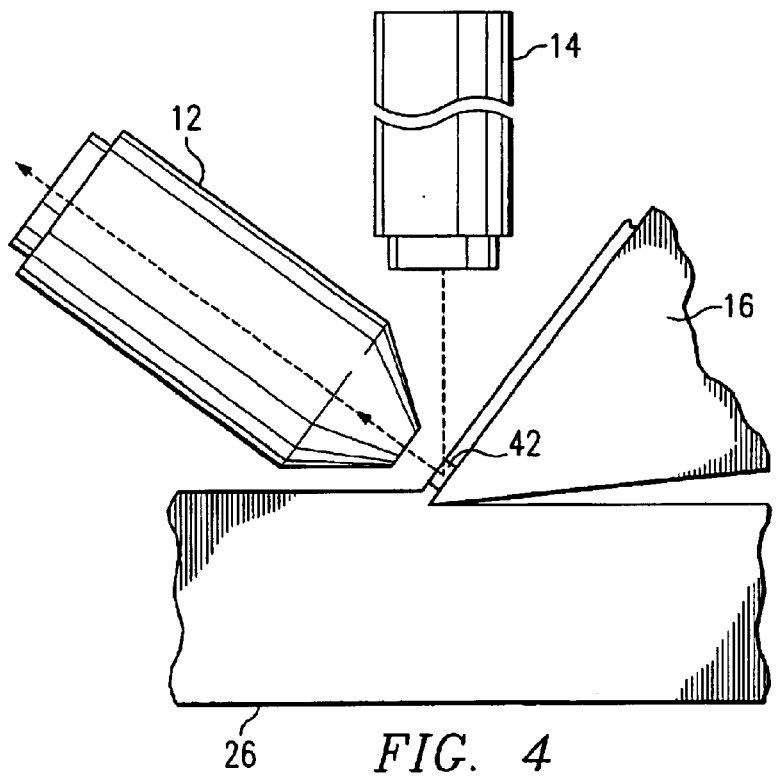
FIG. 4 is a diagrammatic sectional side view of an alternative embodiment of the imaging system of FIG. 1A.

FIG. 4 is a diagrammatic sectional side view of an alternative embodiment of imaging system 10. FIG. 4 illustrates line generator 14 as being positioned normal to a surface of specimen 26 before it is cut. Line generator 14 operates to generate optical energy directed toward band 42 that is being imaged by optical system 12. Optical energy is reflected at band 42 and received or otherwise captured by optical element 12 in order to effect imaging of a target layer of specimen 26. The embodiment of FIG. 4 operates in precisely the same manner as imaging system 10 of FIG. 1A, with the exception of the varied placement of line generator 14.

Figure 5:
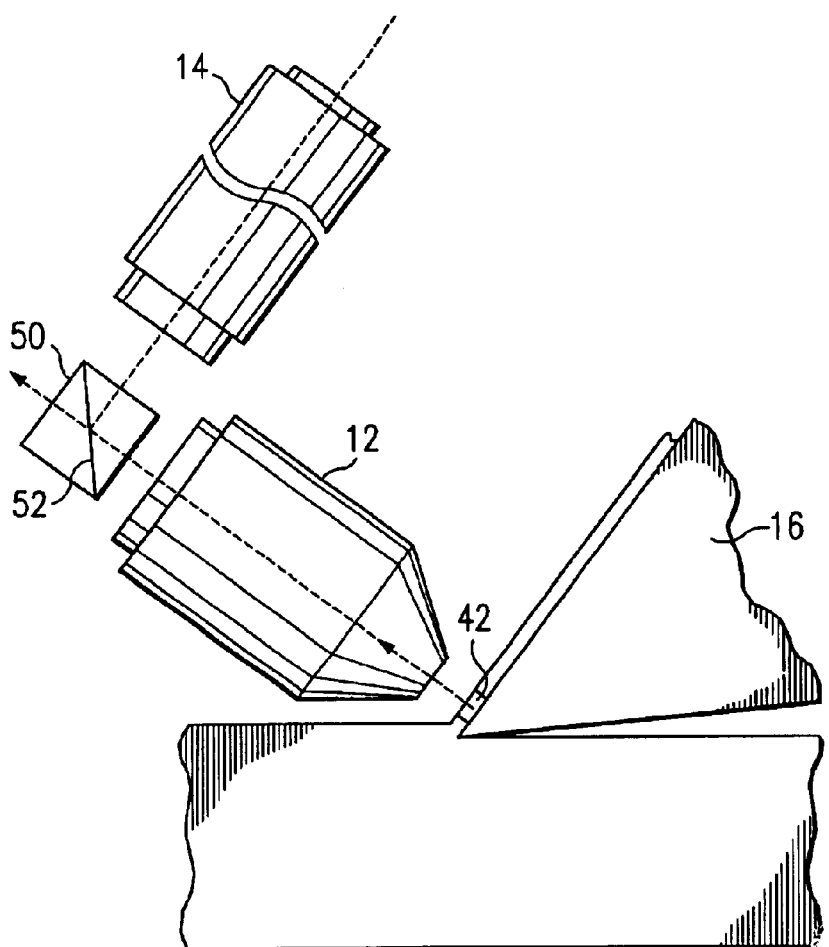
FIG. 5 is a diagrammatic sectional side view of yet another alternative embodiment of the imaging system of FIG. 1A.

FIG. 5 is a diagrammatic sectional side view of yet another embodiment of the present invention. Imaging system 10 has been slightly modified to include a prism 50 that may be positioned between line generator 14 and optical element 12. According to the teachings of the present invention, prism 50 is operable to serve as a one-directional transparent mirror allowing optical energy from one direction to be reflected at reflecting surface 52, while optical energy coming from a different direction passes directly through prism 50. Prism 50 includes a reflecting surface 52 that operates to reflect optical energy generated by line generator 14 that propagates toward reflecting surface 52. The optical energy is reflected at reflecting surface 52 and communicated toward band 42 of specimen 26, via optical element 12. Optical energy is reflected at band 42 and communicated back to optical element 12 where the optical energy is then communicated to prism 50. At prism 50, the optical energy passes through reflecting element 52 and on to a display for potential processing or further review. The alternative embodiment illustrated in FIG. 5 in operation functions generally the same as imaging system 10 of FIG. 1A with the exception of the addition of prism 50 and the changed position of line generator 14.

Figure 6:
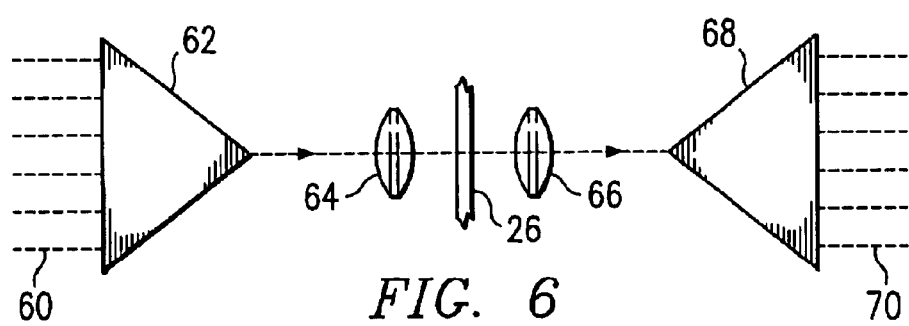
FIG. 6 is a block diagram illustrating a wavelength division multiplexing (WDM) process used in conjunction with the imaging system of FIG. 1A in accordance with one embodiment of the present invention.

FIG. 6 is a block diagram illustrating an alternative processing embodiment of imaging system 10. FIG. 6 illustrates the use of several lasers, for example three laser beams, that serve as multiple optical sources, producing multiple colors within the spectrum. According to one embodiment of the present invention, multiple laser line generators are used to generate optical energy. The use of multiple lasers allows imaging of specimen 26 with imaging system 10 using wavelength division multiplexing (WDM). In the case of several laser beams imaging a portion of specimen 26, each of the laser beams may have an associated wavelength (not necessarily consistent with each other). A variant of this scheme time-modulates the laser line generators in synchronization with gating linear sensor arrays 38, whereby multiple channels representing each laser are cycled.

A series of channels 60 representing multiple wavelengths is illustrated in FIG. 6 as being fed into a multiplexer 62. A collimating optical system 64 is represented as receiving laser energy from multiple channels 60 via multiplexer 62. Collimating optical system 64 may represent line generator 14 as described above with reference to FIG. 1A. The optical energy received by collimating optical system 64 is then directed toward a portion of specimen 26 to be examined.

Specimen 26 reflects a portion of the optical energy it receives to an optical train system 66. Optical train system 66 may be inclusive of components such as the slit-scan camera, lenses 40, and linear array sensors 38 as described above with reference to FIG. 1A. Optical train system 66 includes a portion of the optical energy generated by the multiple laser beams. The optical energy is communicated from optical train 66 to a demultiplexer 68. After the optical energy is demultiplexed, it is communicated to a series of linear array sensors 70, similar to linear array sensors 38. Thus, according to the teachings of the present invention, wavelength defined channels are sent to physically separate linear array sensors 70. Single sensor arrays may be used within linear array sensors 70 such that channel colors are sorted or otherwise filtered during data acquisition relating to a portion of specimen 26 to be imaged. Thus, it should be recognized that the embodiment illustrated in FIG. 6 suggests an alternative manner of processing image data with the use of several optical energy sources or generators that involve a WDM approach to be used in conjunction with the teachings of the present invention.

Although several embodiments have been illustrated and described in detail, it will be understood that various substitutions and alterations can be made therein without department from the present invention. For example, although imaging system 10 is described as being applicable to biological sectioning, the present invention has applications in areas such as histology, clinical histopathology, industrial applications such as in textiles and plastics, and to any other surface or layer in which characteristics, properties, conditions or parameters are sought to be discovered. Such image scanning may also be particularly beneficial in biological research, more specifically gene expression research. Additionally, applications that involve the staining of cells may enjoy substantial success with use of the present invention.

In addition, although described with reference to the placement of components at certain angles or in certain positions, the present invention contemplates that any suitable arrangement or placement of optical element 12, line generator 14, and cutting instrument 16 may be made without departing from the scope of the present invention. The present invention also contemplates the use of multiple line generators 14, multiple edged cutting instruments 16 (cutting multiple layers concurrently), and multiple optical elements 12 without departing from the teachings of the present invention. Additionally, the present invention contemplates the use of wavelength division multiplexing (WDM), or any other processing or communications techniques that may potentially use several optical energy generators.

Numerous other changes, substitutions, variations, alterations, and modifications may be suggested to one skilled in the art and it is intended that the present invention encompass all such changes, substitutions, variations, alterations, and modifications as falling within the spirit and scope of the appended claims.

What is claimed is:

1. A method, comprising:
   generating and directing optical energy through a distal end of a cutting tool;
   internally-reflecting, by the cutting tool, the optical energy at a proximal end of the cutting tool and directing the internally-reflected optical energy out of the cutting tool and through a portion of an object;

cutting the portion of the object while the optical energy is being internally-reflected through the portion; and receiving the internally-reflected optical energy at an optical element while the portion is being cut such that data relating to an image associated with the portion is communicated to the optical element.

2. A method, comprising:

generating and directing optical energy through a distal end of a cutting tool;

internally-reflecting, by the cutting tool, the optical energy at a proximal end of the cutting tool and directing the internaly-reflected optical energy out of the cutting tool and through a portion of the an object;

cutting the portion of the object while the optical energy is being directed through the portion;

receiving the internally-reflected optical energy at an optical element while the portion is being cut such that data relating to an image associated with the portion is communicated to the optical element; and positioning an optical energy generator such that it is co-axial with the cutting tool that is used to cut the portion, wherein the optical energy generator generates the generated and directed optical energy.

3. A method, comprising:

generating and directing optical energy through a distal end of a knife the knife including a tip formed of diamond;

positioning an object with a precision positioning system that is operable to effect motion of the object in one or more directions;

internally-reflecting, by the knife, the optical energy at a proximal end of the cutting tool and directing the internally-reflected optical energy out of the knife and through a portion of the object;

cutting the portion of the object with the knife while the optical energy is being directed through the portion wherein the tip is an optical prism operable to reflect optical energy;

receiving the internally-reflected optical energy from the object at a camera having an objective lens and a tube lens while the portion is being cut such that data relating to an image associated with the portion is communicated to the camera; and focusing, by the objective lens, the optical energy reflected from the portion of the object and directing the focused optical energy toward the tube lens.

4. An apparatus, comprising:

an optical energy generator generating optical energy that propagates from a distal end of a cutting tool to a proximal end of a cutting tool;

the cutting instrument engaged with the object such that the portion of the object may be sectioned, the cutting instrument internally-reflecting at least a portion of the optical energy through the portion of the object to an optical element; and the optical element receiving the internally-reflected optical energy.

5. The apparatus of claim 4, wherein the cutting instrument is a knife that includes a tip formed of diamond.

6. The apparatus of claim 5, wherein the tip is an optical prism that reflects the reflected optical energy toward the optical element.

7. The apparatus of claim 4, wherein the optical element consists of a slit-scan camera that includes an objective lens and a tube lens.

8. The apparatus of claim 4, wherein the optical element comprises a slit-scan camera that includes an objective lens and a tube lens, the objective lens operable to focus optical energy reflected from the portion of the object and to direct it toward the tube lens, and wherein the tube lens receives the optical energy from the objective lens and relays the optical energy to one or more linear array sensors operable to display an image associated with the portion.

9. The apparatus of claim 4, further comprising a precision positioning system supporting the object and effecting motion of the object in one or more directions.

10. The apparatus of claim 4, further comprising one or more additional optical energy generators operable to generate additional optical energy and to direct the additional optical energy toward a surface of the object.

11. The apparatus of claim 4, wherein the optical energy generator is a line generator laser operable to generate a laser beam having a width of approximately 20 to 40 microns.

12. The apparatus of claim 4, wherein the optical energy generator is operable to generate white light that includes one or more white light optical beams having a width of approximately 20 to 40 microns.

13. The apparatus of claim 4, wherein the optical energy generator generates fluorescent energy directed toward the object.

14. The apparatus of claim 4, further comprising a base coupled to a bridge, the bridge supporting the optical element, the optical energy generator, and a sectioning mill for sectioning the object.

15. An apparatus, comprising:

an optical energy generator generating optical energy that propogates from a distal end of a cutting tool to a proximal end of the cutting tool;

the cutting tool, wherein the cutting tool comprises a prism disposed on the proximal end of the cutting tool and operable to direct the optical energy through a portion of an object being cut by the cutting tool; and an optical element receiving the directed optical energy from the prism and communicating the directed optical energy to a portion of the object.

16. An apparatus, comprising:

an optical energy generator generating optical energy that propagates through a distal end of a knife to a proximal end of a knife;

the knife engaged with an object such that a portion of the object may be sectioned, wherein the knife includes a tip formed of diamond, and wherein the tip is an optical prism internally-reflecting a portion of the optical energy through the portion of the object;

a slit-scan camera including an objective lens and a tube lens, the slit-scan camera receiving the internally-reflected optical energy from the optical prism while the portion of the object is being sectioned; and an electronically controlled precision positioning system supporting the object, the precision positioning system operable to effect motion of the object in one or more directions.

17. A knife-edge scanner comprising an optical element, the optical element comprising a transparent knife tip, the optical element providing a collimator optic for a line generator, the knife tip operable to focus illumination beneath a specimen being cut and behind an edge of the knife tip for providing transmission illumination of the specimen.

18. The knife-edge scanner of claim 17, wherein the optical element comprises a prism.

19. The knife-edge scanner of claim 17, wherein the knife tip comprises glass.

20. The knife-edge scanner of claim 17, wherein the knife tip comprises sapphire.

21. The knife-edge scanner of claim 17, wherein the knife tip comprises diamond.

22. The method of claim 1, wherein cutting a portion of the object comprising cutting a portion of the object with a knife that includes a tip formed at diamond.

23. The method of claim 22, wherein the tip is an optical prism operable to reflect the optical energy.

* * * * *